May 13, 1969 C. D. SKIRVIN 3,444,415
FLUORESCENT DISCHARGE LAMP
Filed Dec. 10, 1965 Sheet 1 of 2
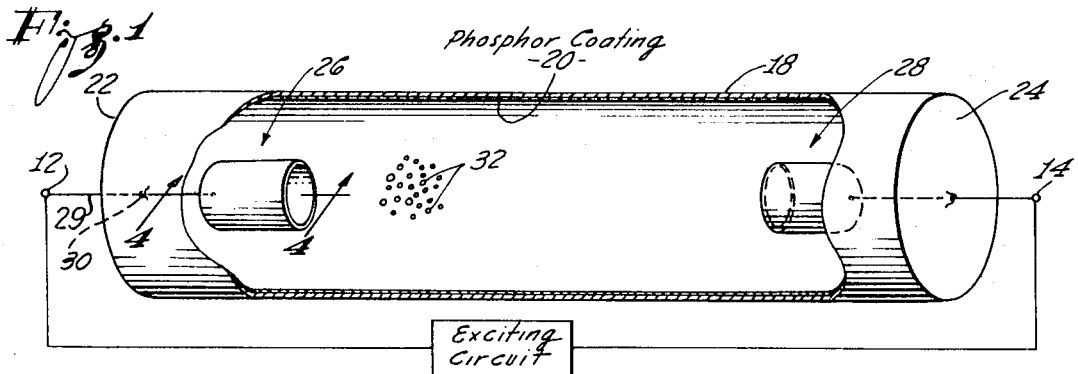
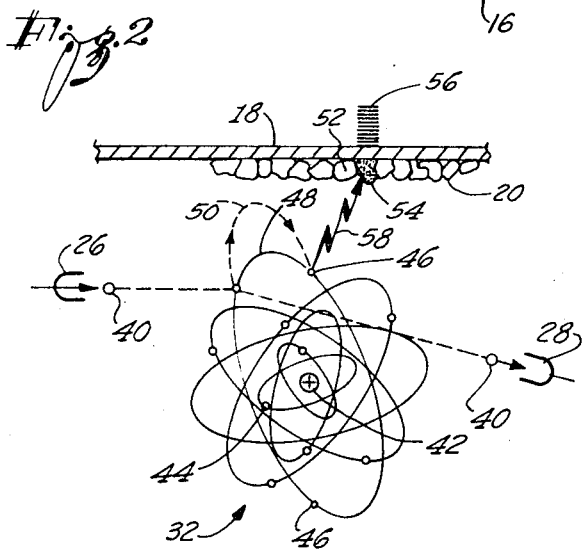
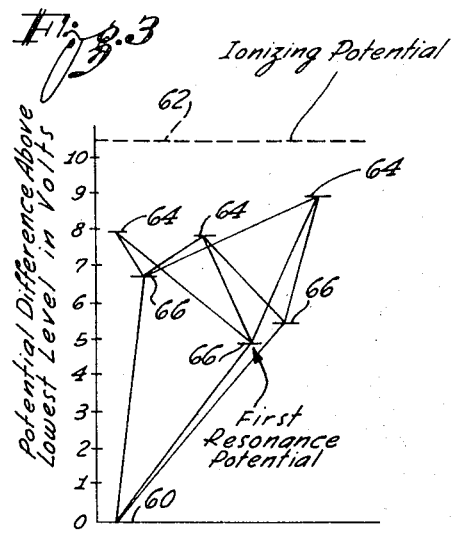
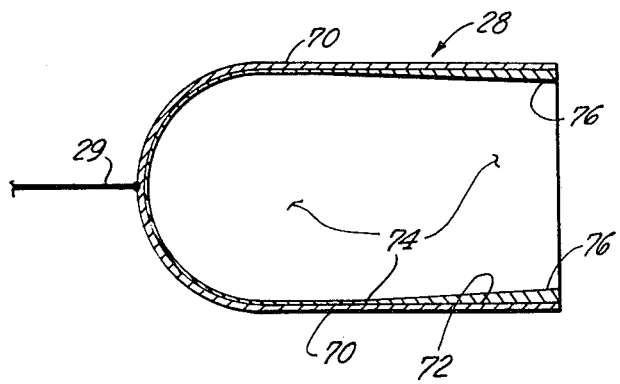
INVENTOR
Clifford D. Skirvin
By Smyth, Roston & Pavitt
Attorneys

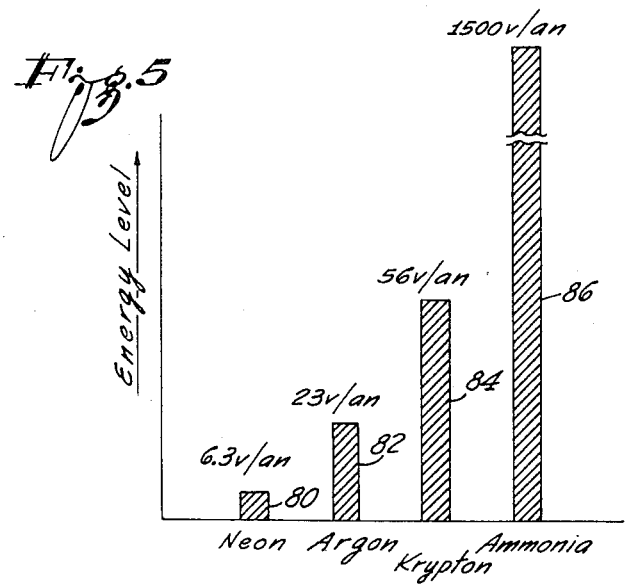
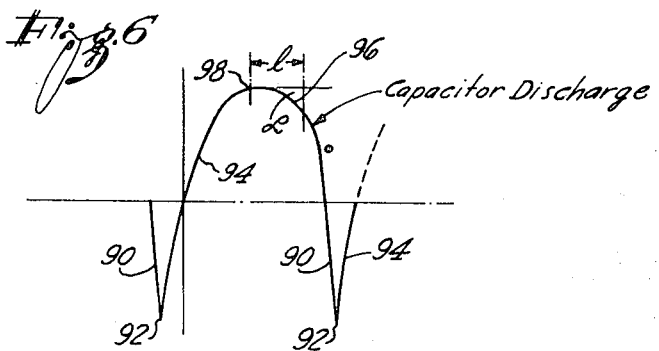
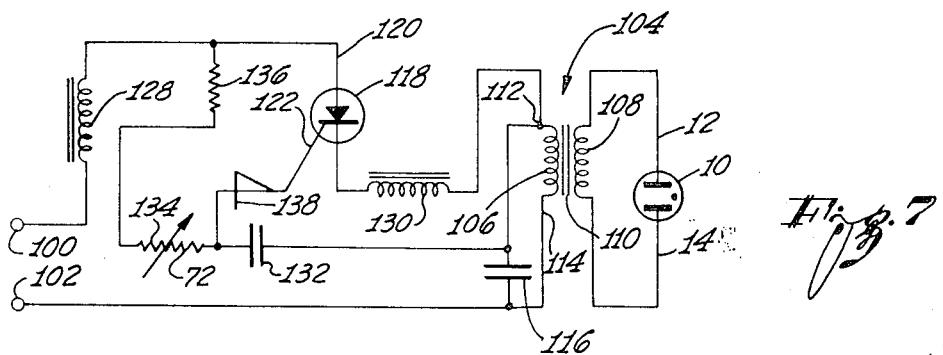

United States Patent Office 3,444,415
Patented May 13, 1969

3,444,415
FLUORESCENT DISCHARGE LAMP
Clifford D. Skirvin, Pomona, Calif., assignor to Microdot, Inc., South Pasadena, Calif., a corporation of California
Filed Dec. 10, 1965, Ser. No. 512,948
Int. Cl. H01j 1/62
U.S. Cl. 313—109                                    16 Claims

ABSTRACT OF THE DISCLOSURE

This invention relates to a system for producing luminescence in fluorescent tubes. The invention includes gases in the tubes for producing ions when energized. The invention also includes a phosphor on the walls of the tube for emitting photons to provide luminescence. The invention further includes a gas such as ammonia in the tube for causing the photons to be produced substantially only in a range of frequencies for producing luminescence. The invention also includes a second gas such as iodine for facilitating the production of luminescence by the photons.

---

This invention relates to luminescent gas tubes and more particularly teaches new principles in the construction, the electrode materials, and the gas pumping thereof.

Most luminescent gas tubes at the present time are electric discharge lamps, usually in the form of a long glass tube coated internally with one or more fluorescent powders commonly called phosphors. Electrodes are located at each end of such tube, and are usually made with iron, nickel, or tungsten, which may or may not be coated with a special electron-emissive substance. The glass envelope of the tube may be straight or bent into a circle or any desired form. The tube is "pumped" (i.e., filled at a certain pressure) with a noble gas or other similar substance, usually neon, argon, krypton, xenon, and vapors of mercury or sodium. In addition, there is inserted in the tube a small drop of mercury which vaporizes during operation of the tube.

In the operation of such a tube an electrical discharge passing from the electrode at one end of the tube to the electrode at the other end through the noble gas and the mercury vapor generates ultraviolet radiation, which in turn excites the phosphor coating on the wall of the tube to emit visible light.

The principles of enhancing lighting efficiency by optimizing the frequency and form of the input excitation signal are set forth in application, Ser. No. 437,127 filed Mar. 4, 1965, in the names of Clifford D. Skirvin, Jerome Zonis and Charles Ketola and entitled, "Frequency Enhancement of Light Emission."

The phosphors in general use in luminescent gas tubes have the characteristic that when they are exited by ultraviolet radiation of about 253.7 millimicrons wavelength, they will emit visible light; that is to say, light in the spectrum of wavelengths between 380 millimicrons and 760 millimicrons. In the past, the above-mentioned mercury vapor has commonly performed the function of converting the energy in an electron discharge into electromagnetic radiation in the proper wavelength for exciting the tube phosphor.

The detailed mechanism of luminescent tube performance is that free electrons emitted from the more negative electrode in the tube collide with the valence electrons of the luminescent gas, in the prior art, mercury vapor. The collision of the discharge electrons with the valence electrons excites the latter by imparting to them part of the kinetic energy of the former, thus raising the valence electrons out of their normal energy level (usually called "valence band") to a level of higher energy (called "conduction band"). When such an excited electron returns to its equilibrium valence band, part of the excess energy discarded as surplus once it returns to its low energy state is emitted as electromagnetic radiation.

According to the presently accepted quantum theory, this radiation is emitted in discreet units called "quanta." The magnitude of each such quantum is $hv$, where $h$ is Planck's constant ($6.62517 \times 10^{-27}$ erg seconds) and $v$ is the frequency in cycles per second of the electromagnetic radiation. Thus the frequency or wavelength of the radiation depends on the amount of energy in the quantum, and the amount of energy in the quantum depends upon the energy level drops characteristic of the specific type of atom or molecule in which the valence electron is changing from excited to valence energy levels. The reason that mercury vapor has been almost universally used as the luminescent gas in fluorescent tubes is that it has a characteristic excited level called "the first resonance potential" that is just far enough above the valence level that when an electron drops from the first resonance potential to the valence level, ultraviolet radiation is emitted. Since this ultraviolet radiation is exactly the wavelength that the phosphor crystals coated on the gas tube envelope will convert into visible light, mercury vapor has been a useful "converter" in the multistage process of converting electron flow energy into visible light energy.

Some common materials used as the phosphors of fluorescent lamps are magnesium tungstate, calcium halophosphate, calcium silicate, and calcium-strontium phosphate. These materials may also be used as the phosphors in applicant's tube. These materials require the presence of activator atoms in their crystal lattice in order to convert photons of light from the luminescent gas into photons of visible light for room lighting. Common activators are antimony, a mixture of antimony and manganese, lead, and tin. It is very important that the phosphors be free of all impurities; for their efficiency of conversion falls off very fast as contaminants begin to appear, even in only hundredths of percent concentration.

The predominant measure of efficiency of performance of luminescent gas tubes is a parameter called "efficacy," which is the ratio of luminous flux output (lumens) to total power input (watts). The highest efficacy theoretically attainable is 680 lumens per watt, which is the output that would be obtained if all the input power were converted to green light at 555 millimicrons wavelength, the light wavelength to which the human eye is most sensitive. The maximum theoretical efficacy of any light source producing white light with its entire output distributed uniformly with respect to wavelength within the visible region is only 200 lumens per watt. Thus it can be seen that by concentrating the output wavelength of any light source near the 555 millimicron point efficacy can be improved beyond that possible with white light. The efficacy of present-day luminescent gas tubes is about 55 to 65 lumens per watt. Sodium vapor lamps have been known to reach efficacies of 90 lumens per watt, but the light emitted thereby is limited to a very narrow double-line spectrum in the yellow region (around 589 millimicrons), so that aside from highway lighting the sodium vapor lamp is not particularly useful.

One of the great problems and sources of expense and weight in present-day fluorescent lamps is the necessity for a starting circuit. Like most gas tubes, a fluorescent lamp has a negative resistance characteristic; that is to say, the resistance across the lamp decreases once current begins to flow through the gas in the tube. Moreover, in order to initiate current flow, a much higher voltage must be imposed across the tube than can be used once the tube is operating normally. Thus present luminescent gas tubes must be started by an especially high voltage generated by capacitor storage or some other transient method. Once they have started, they have to operate with some sort of current control, such as a ballast, in series with one tube electrode and one terminal of the tube power supply. Among the complicated starting methods presently used with fluorescent lamps is the preheat type of system which requires an automatic starting switch, the instant starting system which requires very high voltages, or cathode heating systems where one or more electrodes of the tube are continuously heated so that the tube may start up without requiring a high voltage or a starting switch.

In the course of starting a luminescent tube, a high voltage ranging up to 1000 volts may be used to force electron emission from the electrodes into the tube. This type of electron flow will be maintained until the gases in the tube are ionized to sustain the flow with lower voltage. It is the violence of such starting methods on the electrodes and end fittings of the tubes that limits the service life of luminescent gas tubes. In particular, the oxide coating on the gas tube electrodes "sputters" during starting, causing the characteristic blackening at the end of the tube and reducing the amount of electron-emissive material on the electrode for performing the function of providing electron flow in the tube. Not only does sputter cut down on the service life of tubes but it is also the major factor in the lumen maintenance ability of the tube. The term "lumen maintenance" refers to the capability of the tube of maintaining the same output of luments per watt input throughout its life that it had at some reference time after its service began. Due to the rapid decline in lumen maintenance of the tube in its first hours of service, the reference point is usually taken as the hundred hour point. This initial loss has been found to be about 18% for one type of luminescent tube.

Another disadvantage in present fluorescent lamp systems is the narrow ambient temperature range that the lamp can operate in. A mercury vapor fluorescent lamp reaches its maximum efficacy at 77° F. Above that point the efficacy falls off about 10% for each 20° F. increase, due to the increasing ionization of the mercury vapor molecules due to heat, thus precluding ionization due to electron bombardment. As ambient temperature declines from 77° F., the fall-off in efficiency is even more extreme, for then the mercury droplets present in the tube will not vaporize at all.

Other disadvantages associated with present-day mercury vapor fluorescent lamps include the high end losses and inefficiency of present-day electrodes. Moreover, there is the RFI problem created by the ionization of mercury and its resulting electromagnetic radiation and RFI power line coupling, both of which are capable of creating buzz in radio reception sets in the vicinity of the fluorescent lamp. Although the radiation of RFI can be suppressed somewhat by the use of heavy shielding, the conduction of RFI noise signals back from the electrodes of the fluorescent tube can be prevented only by the use of noise decoupling filters, either in connection with the tube or in connection with the radio sets nearby.

The general purpose of the instant invention is to provide an improved luminescent gas tube that minimizes the effect of the disadvantages discussed above. One major area of improvement is in regard to the efficacy of the gas tube in terms of lumens output of light per each watt of electrical input excitation signal consumed. Another purpose of the invention is to provide a luminescent gas tube that has improved lumen maintenance; that is to say, its light output does not decrease with age or extended service life. Another important purpose to be achieved by the gas tube disclosed herein is the provision of easier starting requirements than in prior tubes so that less heavy and expensive startup circuitry is required. Other objects include the capability of operating in a wider range of ambient temperatures and the extension of electrode life and durability.

In the achievement of the above and other objects and purposes and as a broad feature of the instant invention there is provided a new luminescent gas tube wherein a particular gas such as ammonia gas is used to emit photons of light for conversion by the tube phosphor activator ions. Formerly, ammonia gas has been considered an impurity and somewhat harmful when present in gas tubes, due both to its high burning temperature and extremely high ionization potential of 1500 volts per centimeter (between input excitation signal electrodes), as compared with 6.3 v./cm. for neon and 23 v./cm. for argon.

The present invention features the utilization of the ammonia gas in luminescent tubes in very small, trace amounts. These traces of ammonia are sufficient for full illumination of the tube, yet decrease the ionization potential of ammonia to about 43 v./cm. As another feature of the invention, this 43 v./cm. ionization potential is not required to be imposed across the electrodes of an ammonia luminescent tube because of the presence in the tube of "booster" gases, which serve to impart ionization in a series of steps from a gas of low ionization potential (e.g., neon at 6.3 v./cm.) through intermediate gases (e.g., argon at 23 v./cm.) until finally the ammonia ($NH_4$) ionizes to provide $NH_3+$ ions, which serve as the replacement of the mercury vapor mentioned in the above discussion, i.e., as the luminescent "converter" gas.

The function of ammonia gas in the luminescent tube of the instant invention is not strictly or exclusively of the type of converter discussed above, where the energy of electron collision was directly converted into photons of light. Although it is thought that the ammonia ions do some conversion of this sort, the main function they perform is to absorb photons of light emitted by other gases in the luminescent tube and convert the energy represented by these photons into photons closely confined to the conversion band of the phosphor material coated on the envelope of the tube. In the usual case, where phosphor absorbs ultraviolet wavelengths of electromagnetic radiation and produces light in the visible spectrum using the energy therefrom, the ammonia greatly increases the efficacy of a luminescent tube simply by absorbing photons of light throughout a wide and inclusive spectrum of wavelengths or frequencies and using the energy therefrom to produce photons confined to that narrow ultraviolet range which will be capable of reconversion by the phosphor. Since all photons of electromagnetic radiation present in the luminescent gas tube must be produced by the input electrical excitation signal, the ratio of visible light output to electrical energy input will be greatly increased if as many of these photons as possible can be converted to a wavelength where they will stimulate the phosphor to produce visible light. Thus the photon conversion characteristics of ammonia have increased efficacy of luminescent tubes far beyond the 55–65 lumens per watt range heretofore considered as the maximum achievable.

As another principle of the invention, the injection of small traces of iodine gas, either in vapor or crystal form, will almost double the light output of the inventive luminescent gas tube as discussed above. The iodine vapor acts as a converter and performs population inversion of the electrons, which is to say—it catalyzes or otherwise stimulates increased amounts of electrons into their excited states. Whenever more electrons are in their higher or excited states or energy levels, less energy is required to produce a given amount of light output. Since the efficacy of a luminescent tube is the amount of light output for each unit of input energy, the effect of the iodine gas ($I_2$) is to double the tube efficacy.

Other features of the instant invention relate to the insertion of ammonia gas in a luminescent gas tube and to an entirely different procedure of tube manufacture resulting therefrom. The procedure will be described in more detail below but involves coating upon the electrodes to be used in a luminescent gas tube according to the principles of the instant invention a substance containing the ammonia ion, so that when the electrode is heated to a sufficiently high temperature, the ammonia gas will be released into the tube. This method of tube manufacture makes it possible to "pump" luminescent gas tubes by a far gentler and more economical method than the hot air bombardment and electrical arc stream heretofore used to burn the air and burn off all impurities in the tube. According to the instant invention, a luminescent tube may merely be evacuated to remove atmospheric contaminants and then inductively heated to drive off carbon dioxide and oxides in the electrode metal and to vaporize oils, greases and the like that are present in small amounts in the tube. This inductive heating will also cause the electrodes to release their $NH_4$ into the tube atmosphere. After this evacuation and burning of contaminants, the regular tube gas is inserted. It can be seen that nowhere in the inventive tube manufacturing process is the requirement of an arc stream between the electrodes imposed, so that the electrode depreciation caused thereby is avoided.

Other objects and features of the instant invention and a better understanding thereof may be had by referring to the following description and claims taken in conjunction with the accompanying drawings in which:

FIGURE 1 is a side elevation of a luminescent gas tube according to the principles of the instant invention;

FIGURE 2 is a schematic diagram illustrative of the process of converting electrical energy to visible light, as it takes place in luminescent gas tubes;

FIGURE 3 is an energy level chart showing the performance of conversion substances used in luminescent gas tubes;

FIGURE 4 is a side elevation in cutaway of one electrode of the tube in FIGURE 1;

FIGURE 5 is a chart of the ionization potentials of various gases usable in luminescent gas tubes;

FIGURE 6 is a graphical illustration of a preferred waveform for the input electrical excitation signal used across the electrodes of the tube of FIGURE 1; and FIGURE 7 is a schematic diagram of a preferred electrical circuit for applying the waveform of FIGURE 6 across the electrodes of the tube of FIGURE 1.

Referring to FIGURE 1, a preferred embodiment of a luminescent gas tube according to the principles of the instant invention is a tube 10 having a first electrical input terminal 12 and a second electrical input terminal 14. Input electrical excitation signals are applied across the terminals 12, 14 by a circuit 16, which will be discussed more specifically below. The tube 10 has an outer envelope 18 made of glass or the like. The inside wall of the envelope 18 is coated with a phosphor 20.

The glass envelope of the tube 10 has two ends 22 and 24. Associated with each end 22 and 24 is an electrode 26, 28, respectively. Each electrode 26, 28 is electrically connected to its respective terminal 12, 14 by a lead 29 which passes through the respective end wall 22 or 24 at a point 30 which must be hermetically sealed in order that the pressures and gas compositions of the luminescent gases inside the envelope 18 will not be able to degenerate due to escape into the outside atmosphere or contamination therefrom.

According to the principles of the instant invention, the envelope 18 is pumped with a mixture of gas molecules (represented at 32). In a tube pumped according to the principles of the instant invention, the molecules 32 would preferably include a mixture either of neon gas and argon gas or of neon gas and krypton gas. In the former case, the partial pressure of the neon would be about ⅓ mm. Hg, while the partial pressure of the argon would be about 4½ mm. Hg. In the neon-krypton mixture, it has been found best to use about ¼ mm. Hg of neon and about 4½ mm. Hg of krypton. Other such gas components and mixtures are possible, but those specified above have been found to provide the best performance of progressive ionization to ionize the traces of ammonia also in the mixture of molecules 32. As stated above, the mixture 32 might also contain molecules of iodine vapor or some other halide or substance of similar conversion characteristics according to the principles of the instant invention.

Referring to FIGURE 2, the performance of the tube 10 in the process of fluorescent lighting is as follows: An input electrical excitation signal is applied by the circuit 16 across the electrodes 12, 14. This signal causes a voltage difference to occur between the electrodes 26 and 28, so that there is a tendency for electrons to pass therebetween through the gas 32. FIGURE 2 is a schematic diagram showing what takes place as the electrons passing between the electrode 26 and the electrode 28 interact with the molecules 32. The electron emitted from one of the electrodes 26, 28 will hereinafter be referred to as a conduction electron and will be denoted by the numeral 40. Conduction electrons 40 may proceed from either electrode 26 or 28, depending on which is at the more negative potential under the influence of the signal from 16; i.e., depending on which is acting as the momentary or instantaneous cathode of the tube 10. Since it is common to apply AC signals at 60 c.p.s. or greater across the terminals 12, 14, the cathode-anode relationship of the electrodes 26, 28 would reverse every half cycle.

Referring to FIGURE 2, an electron 40 proceeding from the cathode (here shown as the electrode 26) of the tube 10 would eventually collide with one of the molecules 32. Each such molecule has a nucleus 42, inner electrons 44, and outer or valence electrons 46. The difference between the inner electrons 44 and the valence electrons 46 is that the inner electrons cannot be excited out of their orbits, whereas the valence electrons 46 can be either excited to wider orbits or completely separated (ionized) from the molecule 32. The orbit of the valence electrons 46 of the molecule 32 is represented at 48.

The effect of collision between a conduction electron 40 and a molecule 32 is a deflection of the electron 40 and a corresponding deflection of one of the valence electrons 46. The electrons 40 and 46 do not come into actual physical contact, but they do reach sufficient proximity to have gravitational and electromotive effect on one another. Thus the conduction electron 40 excites the valence electron 46 by imparting to it part of the kinetic energy of the conduction electron 40. This results in raising the valence electron 46 from its normal energy level represented by the orbit 48 to a higher energy level represented by the orbital path 50. As the shortness of the path 50 implies, the valence electron 46 spends only a short time in its excited state.

After collision the conduction electron 40 loses speed and changes direction, but it does continue along the tube 10 to excite or ionize one or more additional atoms 32 before losing its energy step by step and thus completing its travel. The end of its free conduction path will usually be at the wall 18 of the tube 10, where it recombines with an ionized atom. A portion of the electron current, however, is collected by the anode, in FIGURE 2 the electrode 28, for the electrical field across the tube does maintain a conduction electron density throughout the entire length.

As stated above, it is only a short time before the excited valence electron 46 returns from its excited orbit 50 to its normal orbit 48. This return may be made either in a single transition or by a series of discreet steps from one excited level to a lower excited level. Each of the discreet steps is distinguished by the emission of one photon or quantum of electromagnetic radiation. Referring to FIGURE 3, the chart therein shows the different excited levels available to a valence electron in a typical luminescent gas (mercury vapor).

A zero-level 60 at the bottom of the energy level graph of FIGURE 3 (called the "valence level") represents the kinetic energy that an electron 46 would have when it is in its valence orbit 48. The dotted line 62 at the top of FIGURE 3 (called the "ionization potential") represents the number of electron volts necessary to completely free a valence electron 46 from an atom 32, if that atom is mercury. This ionizing potential is 10.38 volts per centimeter of electrical field. The ionization potential for other gases found in luminescent tubes is as follows: neon—6.3 volts per centimeter; argon—23 volts per centimeter; krypton—56 volts per centimeter; xenon—63 volts per centimeter; nitrogen—64 volts per centimeter; and ammonia—1500 volts per centimeter.

Thus it can be seen that the mercury vapor used in prior luminescent gas tubes had at least the advantage of not requiring a high ionization potential to support conduction between electrodes of the tube, while the ionization potential of ammonia is so high that the tube would be destroyed long before conduction through the ammonia could be achieved. However, since mercury vapor has the disadvantages discussed above, it is one feature and a great advantage of the instant invention to make it possible to use ammonia in luminescent gas tubes while not having to raise this ammonia to its ionization potential by the direct imposition of the enormous ionization voltage heretofore thought necessary.

FIGURE 3 shows a number of discreet excited levels 64 for mercury and these levels exist for all the other luminescent tube gases mentioned above. The important level, though, is that shown at 66. It is called the first resonance potential of the gas.

Whenever an electron 46 drops from one level 64 or 66 to a lower level 60, 64 or 66 the amount of energy (quantum) represented by the difference between the necessary kinetic energy of the electron 46 at the higher level 64 or 66 and the kinetic energy of the electron 46 at the lower level that it is dropping to 60, 64, or 66, is emitted in the form of electromagnetic radiation. Since the potential levels 60, 64 and 66 are fixed quantities for each type of atom or molecule 32, the electromagnetic radiation emitted by these changes in state is characteristic for each such substance. Upon any single change from level to level, one photon of electromagnetic radiation is emitted. The wavelength of this radiation will be determined by Planck's formula: $E_h - E_1 = h\nu$, where $E_h$ equals the higher potential level which the electron left; $E_1$ equals the lower potential level which the electron fell into; $h$ equals Planck's constant; and $\nu$ equals the frequency of the emitted radiation.

Since all of the levels 64 and 66 are fixed for any substance, the $\nu$ for electrons passing therebetween will also be fixed, giving that substance characteristic frequencies or lines of radiation. The special importance of the first resonance potential 66 is that the frequency of radiation emitted by an electron 46 traveling from the level 66 down to the valence level 60 is within the ultraviolet range which will stimulate materials in the phosphor coating 20 to emit photons in the visible light range.

The material 20 is composed of phosphor crystals 52 including a very few "activator crystals" 54 in which an atom or a molecule of activator substance has been inserted in the crystal lattice. The effect of the activator crystals is to provide photon emission potentiality to the phosphor, because the disturbed crystals 54 have "traps" similar to the levels 64, 66 shown in FIGURE 3. When valence electrons in the activator crystals 54 are excited above their valence level (analogous to that shown at 60 in FIGURE 3), rather than going all the way to the conduction state (analogous to that shown at 62 in FIGURE 3), they rise to various traps 64, 66 and then fall back to the valence level 60. In doing so they emit electromagnetic radiation 56 in the visible light range. Electrons in the crystals 54 are stimulated above their valence level 60 to their traps 64 and 66 by the absorption of the crystals 54 of ultraviolet radiation 58 from the molecules 32 in the luminescent tube 10.

Thus the luminescent lamp process represented in FIGURE 2 has the following steps:

(1) An electrical field between the electrodes 26 and 28 causes the emission and travel of electrons 40.

(2) The electrons 40 collide with the valence electrons 46 of the gas molecules 32, causing the valence electrons 46 to leave their normal orbits 48 for an excited orbit 50.

(3) The valence electrons 46 return from their excited orbit 50 toward their valence orbit 48 through a number of discreet steps as shown in FIGURE 3. The drop from each discreet step 64 or 66 to a lower discreet step 60, 64 or 66 results in the emission of surplus energy in the form of electromagnetic radiation of a frequency determined by Planck's formula.

(4) Electromagnetic energy emitted by the electron 46 is radiated as shown at 58 to the phosphor crystals 52 and 54.

(5) Activator crystals 54 absorb certain wavelengths of electromagnetic energy.

(6) The energy absorbed by an activator crystal 54 excites a valence electron therein into an excited orbit, and in returning to its valence orbit the valence electron emits visible light 56.

The importance of the ammonia insertion taught by the instant invention has in its intervention between Steps 4 and 5 in the above process. The ammonia molecules absorb photons of energy from a broad band of wavelengths and emit photons in only those certain wavelengths that are absorbable by the activator crystals 54. Were the other wavelengths of photons not so converted by the ammonia, the energy embodied in them would be dissipated and would be one factor in the very low luminous efficiency of luminescent tubes. By acting as a "photon converter" to convert photons outside the absorption band of the activator crystals 54 to photons within that band, the ammonia gas doubles the efficiency of tubes.

The main problem of practicing the principle of inserting traces of ammonia gas in a luminescent glass tube is very simply getting the gas there in the first place. When mercury was used, the insertion of a known amount of mercury in droplet form would suffice. The presently practiced method of evacuating, decontaminating and then pumping luminescent gas tubes does not provide an opportunity for inserting small enough traces of ammonia.

Referring to FIGURE 4, the section of the electrode 28 shown therein illustrates the ammonia-insertion features and to some extent the entire tube manufacture features of the instant invention. The electrode 28 is composed of a metal body 70, which in the practice of the instant invention was constructed of Swedish iron. The body 70 is cup-shaped and has an inner wall 72. The lead 29 is electrically connected to the body 70 at the "bottom cup." According to the principles of the instant invention the inside wall 72 of the cup 70 is coated with an electron emissive material 74.

The material to be coated at 74 may be any electron-emissive material, but best results have been obtained by following the practice to be described hereinafter. First a powder mixture of barium carbonate, strontium carbonate and calcium carbonate is assembled. The relative weight of the barium carbonate, strontium carbonate and calcium carbonate should preferably be about 56%, 31%, and 13%, respectively, but other percentages of relative weight should also be used. The above powder mixture constitutes the electron-emissive substances to be coated on the cup 70. To this mixture is added ammonium carbonate, preferably of high purity, in a weight ratio of one-third ammonium carbonate for two-thirds of the electron-emissive powder. In the process of coating the cup 70, the above-described powder mixture is made into a slurry using distilled water.

The slurry is coated on the inside wall 72, and the electrode is then baked at about 250° C. for 12 minutes to get rid of the water in the slurry, leaving the well-mixed substances of the powder mixture baked to the inside wall 72. In the process of baking the electrode is preferably hung with the open end of the cup downward so that the slurry dries into the coating 74 with a large amount of its material concentrated at the lips 76 of the electrode. Since all electron emission must pass out of the open end of the cup 70, it can be seen that the concentrations at 76 are well adapted to supplying electron flow at more widely divergent angles than are the portions of the coating 74 farther inside the cup 70. In the manufacture of electrodes according to the invention it has generally been the practice to apply more than one layer of slurry and therefore to bake several times. In each such cycle the calcium carbonate in the slurry acts as a cementing agent to hold that particular layer to the inner wall 72 or to the layer below it. Thus an almost inexhaustible source of electron-emissive material can be coated on the inside of the cup 70. Since the main cause of prior tube failure has been the sputtering off of all electron-emissive material from the electrodes, this inexhaustible supply greatly adds to the service life and indeed to the lumen maintenance of the tube 10 of the instant invention.

The function of the ammonium carbonate in the slurry mixture baked on to the electrodes of the instant invention at 74 and 76 is as follows. After an electrode made according to FIGURE 4 is installed in a tube 10, the process of tube manufacture, whether according to the prior art or according to the instant invention, proceeds with some sort of evacuation of the atmosphere in the tube and some sort of high level heating of the tube to burn off all oxides and other contaminants that might damage the tube if they remained and were heated in the course of tube operation. This baking of the tube generally gets the metal 70 to a high enough temperature where it is cherry red, and thus most of the ammonium in the ammonium carbonate coated at 74 and 76 is driven off to become ammonia gas and is pumped out of the tube along with all the other contents thereof during the evacuation process.

However, because ammonia gas has the capability of permeating most of the phosphor materials used to coat tubes 10 as shown at 20 of FIGURE 1, the necessary trace of ammonia for operation of the tube 10 as described above remains in the phosphor during the evacuation process and upon heating of the tube during operation appears among the molecules 32 in the operation of the tube. Furthermore, some ammonium ions remain in the electrode and cause ammonia to be emitted into the tube when the electrodes become heated by the passage of an electrical current through the tube. Thus by coating ammonium carbonate on the electrodes of the tube 10, the traces of ammonia necessary for the tube operation according to the instant invention are left in the tube due to their ability to permeate the phosphor coating 20 and to remain in the electrodes 26 and 28.

According to one feature of the instant invention, an electrode made as described above can be used in any luminescent tube and in any process of tube manufacture. However, such an electrode makes possible the manufacture of luminescent tubes using a less destructive pumping method than that presently used, whereby inductive heating replaces the old arc stream between the electrodes 26, 28 as the heat source for burning contaminants. The full process is: (1) evacuation of air and other contaminants from tube 10, (2) heating the inside of the tube by the use of inductive devices outside the envelope 18, (3) baking the tube at 250° C., and (4) after the tube 10 cools, pumping in the gas molecules 32 and hermetically sealing the tube. The inductive heating Step 2 has been found to give a more thorough burning off of $O_2$, $CO_2$, oil, grease, and other contaminants than did the combined hot air bombardment and arc stream from electrode to electrode heretofore used. Moreover, the inventive process is quicker and requires less manufacturing equipment.

It should be noted that the presence of ammonia in the above-described form changes the characteristics of luminescent tubes. Prior art tubes had an inverse temperature reaction, which is to say, that the hotter the tube became the more current it drew while at the same time the lower its lumen output fell. As a result, its efficacy in terms of lumens per watt of power drawn would fall off with high temperature. The presence of the ammonium permeated into the phosphor coating of the tube and into the electrodes 26 and 28 reverses this temperature characteristic, for the higher the temperature, the more ammonia is released. Moreover, the ammonia gas so released is characterized by a very high burning or heat-ionization level. Thus as heat goes up the lighting characteristics of this gas improve. Ordinarily, ammonia would ionize only by the application of very high currents and very high heating temperatures; but in the trace amounts in which it appears in the tube 10, the more predominant numbers of neon, argon, krypton, etc. molecules cause it to "ride" or go along with these other gases at their lower energy levels.

Referring to FIGURE 5, the ionization relationship of the gases collected at 32 in the tube 10 is represented by showing the energy levels required to achieve ionization of each. Thus neon 80, with its low ionization level of only 6.3 volts per centimeter, is very easily ionizable when used in a luminescent tube. Accordingly, even in the present practice of luminescent gas tube manufacture, some amount of neon is usually present in the tube pumping. Next beyond neon are the "intermediate" gases, such as argon 82 or krypton 84, which have ionization potentials of 23 and 56 volts per centimeter, respectively. Due to the fact that neon present with these gases ionizes at much lower levels, an electrical current can be set up between the electrodes 26, 28 of a luminescent tube such as that of FIGURE 1 without reaching the full ionization potential of the argon or krypton, so that resistive heating can begin and the ionization of these intermediate gases can be achieved by a combination of heat-induced ionization, photon-induced ionization (the photons coming from the neon), and electrical potential-induced ionization.

In like manner, the completely impossible voltage level 86 and heating required to ionize ammonia gas can be brought down to an easily achievable level because the ammonia gas in infinitesimal amount is riding or benefiting from the ionization of the neon, argon and krypton mixed with it at 32. Thus ammonia has been found operative in luminescent tubes with only a potential difference of 43 volts per centimeter when the gas mixture has been that disclosed above.

Referring to FIGURE 6, a preferred waveform for the input electrical excitation signal generated at 16 and applied across the electrodes 12, 14 is graphed therein. The abscissa of the graph is time and the ordinate of the graph is voltage, although current and power supplied across the terminals 12, 14 would be roughly the same. The purpose of the applied waveform of FIGURE 6 is to supply energy to the luminescent gas molecules 32 in the tube 10 whereby valence electrons 46 of the individual atoms 32 of the gas are excited out of their normal orbits 48 into some excited orbit 50. When the electron 46 later returns to its normal orbit 48, its excess energy is emitted as a quantum of radiation, as discussed above. Accordingly, each cycle of input excitation signal begins with a negative-going excursion 90 which reaches a low point 92. Thereafter, the wave rises at 94 and then decays slowly at 96 before beginning another negative excursion at 90. A high point is reached at 98, fairly near the beginning of the positive-going excursion 94.

The high initial level 98 forces a maximum of energy across the gas 32 at the beginning of each cycle; then the decay 98 imposes an infinitude of harmonics (ranging up to hundreds of megacycles in frequency) upon the gas tube electrodes 26, 28. At certain fundamental frequencies of the waveform of FIGURE 6 determined by tube 10 diameter, contents, pressure and other characteristics, one or more of the higher harmonics in the applied waveform of FIGURE 6 will traverse the tube 10 in such manner that the gases 32 will offer greatly reduced attenuation to said harmonics. Moreover, as is usual with luminescent gases, the gas 32 exhibits various spectral characteristics and increased efficacy in certain very small wave bands, so that variation of the fundamental frequency by changing the length $l$ or the angle $\alpha$ of the decaying slope 96 of the waveform of FIGURE 6 will vary the applied harmonics until one appears that brightens the gas tube 10 considerably without expending any more applied power from 16. A more extensive discussion of these input electrical excitation signal principles may be found in the above-cited U.S. application Ser. No. 437,127.

Referring to FIGURE 7, the oscillator circuit shown schematically therein is a preferred power supply circuit for use in the position 16 of FIGURE 1. It converts power from a line or other source which is applied across its power supply input terminals 100 and 102. It has an output transformer 104 having a primary 106 and a secondary 108. The ends of the secondary 108 are coupled to the terminals 12, 14 of the tube 10 of FIGURE 1. The transformer 104 has a core 110 which, for the purposes of RFI suppression—at least as far as noise appearing on the terminals 12, 14 is concerned—should be made of a very lossy, absorptive, and non-square-loop magnetic material.

The coil 106 has a first end 112 and a second end 114. A capacitor 116 is connected across the ends 112, 114 and is selected of such value as to coact with the primary 106 and all the reflected impedances appearing thereacross to form a resonant tank. The second end 114 of the primary 106 may be directly connected to the input terminal 102 of the power supply for the circuit of FIGURE 7.

A silicon-controlled rectifier 118 is used to gate power from the terminal 100 of the power supply to the first end 112 of the primary 106 The SCR 118 has an input electrode 120, a control electrode 122 and an output electrode 124. The input electrode 120 is connected through a first inductor 128 to the power supply terminal 100, while the output electrode 124 is connected through a second inductor 130 to the end 112. A timing circuit for the SCR 118 includes the series combination of a capacitor 132, a potentiometer 134, and a padding resistor 136 connected between the input electrode 120 of the SCR 118 and the end 112. A semiconductor trigger 138 is then connected from the control electrode 122 to a point between the capacitor 132 and the potentiometer 134.

In the operation of the circuit of FIGURE 7, the SCR 118 is a semiconductor switching device PNPN variety and thus has an "on" or conductive state and "off" or nonconductive state. Control signals for switching the SCR 118 are created by the charging and the discharging of the capacitor 132. The speed of this charge and discharge is determined by the setting of the potentiometer 134. When the capacitor 132 has charged up to a certain level the trigger 138 "fires" to deliver a sharp pulse to the control electrode 122 of SCR 118, whereupon the SCR 118 is switched from its nonconductive to its conductive state.

Under the influence of the timing signals applied by the trigger 138, the SCR 118 is periodically switched "on," closing the circuit from the input terminal 100 through the inductor 128 and the inductor 130 to the first end 112 of the primary 106. The first effect of this closing is to cause a back EMF in the inductor 128 so that the voltage at the first end 112 of the primary 106 drops in the manner indicated at 90 of FIGURE 6. After this voltage is dropped as far as it will go to the point 92 the capacitor 132 is dragged down with it so that the voltage at the input of the trigger 138 goes negative and the trigger no longer supplies a positive signal to the control electrode 122 of the SCR 118. Therefore, at the low point 92 of the waveform of FIG. 6, when the waveform is ready to begin its climb at 94 the SCR 118 is turned off due to the tendency of current to flow backwards therethrough.

Once the SCR 118 is turned off, the primary 106 begins to "collapse" or break down in its initial EMF and permit passage of current therethrough. This phase is represented by the leading edge 94 which climbs from the low point 92 to the high point 98. After the high point 98 is reached, discharge of the capacitor 116 through the primary 106 causes the voltage to pass through the decay portion 96 of the waveform of FIGURE 6. It should be noted that the effect on the capacitor 116 not only of the impedance of the primary 106 but also of the instantaneous impedance across the tube 10 and the reflected impedance across the secondary 108 will influence the instantaneous value of the length $l$ and the slope $\alpha$ of the capacitor discharge curve 96.

At the end of the capacitor discharge curve is the next steep negative excursion 90 which takes the voltage level down to the point 92 before another cycle begins. This deep negative excursion has the effect of lowering the reference potential of the luminescent gas molecules 32 in the tube 10, so that charged particles in the mixture become recombined into the molecules. This in turn causes the positive-going portion of the waveform of FIGURE 6 to have a maximum excitation effect in producing charged particles in the next cycle of operation.

An ammonia-converter luminescent tube in accordance with the inventive principles discussed above was built and operated with an almost phenomenal increase in tube efficacy. If the tube 10 was operated off a normal 60 c.p.s. cinewave power supply, the efficacy was increased by about 80% over those heretofore achieved with ordinary luminescent tubes. If the frequency was increased, the improvement in efficacy was over 100%, probably because as the frequencies increased the electrodes 26 and 28 would get hotter so that the ammonium carbonate on the electrodes and possibly present in the tube atmosphere would reach higher temperatures and thus liberate more ammonia gas. As stated above, if the tube 10 is further improved by the injection of pure iodine as vapor in infinitesimal amounts, the efficiency of the tube will be doubled again over what was achieved by the injection of traces of ammonia. The iodine appears to act as a further gatherer of photons for conversion into the particular range of frequencies that are best converted by the tube phosphor. Such being the case, the iodine vapor will double the efficiency of luminescent gas tubes whether or not they are of the ammonia-converter type as discussed above.

Thus applicant has achieved not only an improved luminescent gas tube but also an improved method of making the luminescent gas tube and an improved electrode for a luminescent gas tube and an improved method of making the electrode for the tubes. The principles of these improvements center about the use of heretofore unknown photon wavelength converters, such as ammonia, iodine, and other substances that perform the equivalent function in trace amounts in the luminescent gas tube. In order to practice this inventive principle, however, the related processes for getting these trace amounts of converter substance into the gas tube are most helpful. The inclusion of the converter-gases in the electrode coating seems so far to be the best method of insertion, as far as infinitesimal amounts of gas are concerned.

In summary, it is a broad feature of the instant invention that there is provided a new luminescent gas tube wherein ammonia gas or some other photon-converter is used to emit photons of light for conversion by the tube phosphor activator ions. Formerly, ammonia gas has been considered an impurity and somewhat harmful when present in gas tubes because of its high burning temperature and high ionization potential, but the present invention achieves the utilization of the ammonia gas in luminescent tubes by using it in very small, trace amounts. These traces of ammonia are sufficient for full illumination of the tube, yet decrease the ionization potential of ammonia to about 43 v./cm.

As another feature of the invention the high temperatures and the full ionization potential of ammonia gas is not required to be imposed across the electrodes of an ammonia luminescent tube because of the presence in the tube of "booster" gases, which serve to impart ionization in a series of steps from a gas of low ionization potential (the neon 80 at 6.3 v./cm.) through intermediate gases (the argon 82 at 23 v./cm.) until finally the ammonia ($NH_4$) ionizes to provide $NH_3+$ ions. These ions then perform the heretofore undiscovered economizing step of converting photons to a more usable wavelength.

The main function performed by the ammonia gas photon converter is to absorb photons of light emitted by other gas in the luminescent tube 10 and convert the energy represented by these photons into photons closely confined to the conversion band of the phosphor material 52, 54 coated on the envelope of the tube 10. In the usual case, where the phosphor 54 absorbs ultraviolet wavelengths of electromagnetic radiation and produces light in the visible spectrum using the energy therefrom, the ammonia greatly increases the efficacy of a luminescent tube simply by absorbing photons of light throughout a wide and inclusive spectrum of wavelengths or frequencies and using the energy therefrom to produce photons confined to that narrow ultraviolet range which will be capable of reconversion by the phosphor. Since all photons of electromagnetic radiation present in the luminescent gas tube 10 must be produced by the input electrical excitation signal from 16, the ratio of visible light output to electrical energy input will be greatly increased if as many of these photons as possible can be converted to a wavelength where they will stimulate the phosphor 52, 54 to produce visible light. Thus the photon conversion characteristics of ammonia have increased the efficacy of luminescent tubes even more than double the 55–65 lumens per watt range heretofore considered as the maximum achievable.

As another principle of the invention, the injection of small traces of iodine gas, either in vapor or crystal form, will again double light output of luminescent gas tubes. The iodine vapor acts as a photon converter and performs population inversion of the electrons, to get more into their excited states. Whenever more electrons are in their higher or excited states or energy levels, less energy is required to produce a given amount of light output. Since the efficacy of a luminescent tube is the amount of light output for each unit of input energy, the effect of the iodine gas is to double the tube efficacy.

Other features of the instant invention relate to the method of insertion of ammonia gas in a luminescent gas tube and to an entirely different procedure of electrode and tube manufacture resulting therefrom. This procedure, described in detail above, involves coating upon the electrodes 26, 28 to be used in a luminescent gas tube 10 according to the principles of the instant invention a substance containing the ammonia ion, particularly ammonium carbonate, so that when the electrodes 26, 28 are heated to a sufficiently high temperature, the ammonia gas will be released into the tube 10. This method of tube manufacture makes it possible to pump luminescent gas tubes by a far gentler and more economical method than the hot air bombardment and electrical arc stream heretofore used to burn the air and burn off all impurities in the tube. According to the instant invention, a luminescent tube may merely be evacuated to remove atmospheric containments and then inductively heated to drive off carbon dioxide and other oxides in the electrode metal and to vaporize oils, greases and the like that are present in small amounts in the tube 10. This inductive heating will also cause the electrodes to release their $NH_4$ into the tube atmosphere, whereupon it permeates the phosphor 52. After this evacuation and burning of contaminants, the regular gas such as neon and argon and xenon is inserted into the tube. It can be seen that nowhere in the inventive tube manufacturing process is the requirement of an arc stream between the electrodes 26, 28 imposed, so that the electrode depreciation caused by sputter is avoided.

Although the invention has been described in its preferred form with a certain degree of particularity, it is understood that the present disclosure of the preferred form has been made only by way of example and that numerous changes in the details of construction and the combination of arrangements of parts may be restored to without departing from the spirit and scope of the invention as hereinafter claimed.

I claim as my invention:
1. A luminescent tube having
   a hermetically sealed envelope having first and second ends,
   a phosphor coating on the inside of said tube,
   an electrical lead passing through the first end of the hermetically sealed envelope,
   an electrode electrically connected to the electrical lead, said electrode including a substance having high electrical conductivity and a high rate of electron emission under the influence of electrical excitation,
   a luminescent gas mixture inside the hermetically sealed envelope, said luminescent gas mixture including a first inert gas which ionizes at a low energy level and a second inert gas which ionizes at an energy level higher than that of the first inert gas, and ammonia gas in said luminescent gas mixture.
2. In combination:
   a tube having a glass envelope and a phosphor coating on the glass envelope and containing molecules of a gas capable of being ionized and being subjected to resonances in a first particular range of frequencies having characteristics of providing a high level of luminescence at relatively low temperatures,
   an electrode in the tube and having a coating layer formed from a material with properties of providing an emission of electrons through an extended range of frequencies including the first particular range and having a second material in the coating layer with properties of emitting a gas into the tube for limiting the range of frequencies of light photons in the tube to substantially a second particular range where the photons in the second particular range of frequencies are capable of stimulating the phosphor on the wall through the second particular range of frequencies or to emit visible light, and
   means operatively coupled to the electrode for producing an emission of electrons from the coating on the electrode in the first particular range of frequencies and an ionization of gas in the tube to emit photons at the second particular range of frequencies.
3. An electrode for use in a gaseous tube having a phosphor coating on the walls of the tube, including
   a metallic base material having properties of passing an electrical current and of becoming heated upon the passage of the electrical current to emit charged particles,
   means for providing a passage of the electrical current through the metallic base material, and
   a coating on the base material in the form of a thin film, the coating having a first chemical component for accelerating the charged particles emitted by the base material and having second chemical components for emitting a gas for ionization by the charged particles emitted by the base material and, when ionized, for exciting the phosphor coating, the gas emitted by the coating being ammonia and the first chemical component being selected from a group consisting of compounds of barium, strontium and calcium.

4. A gaseous tube, including
an envelope defined by envelope walls,
a phosphor coating on the envelope walls to provide a luminescence of the tube when excited,
an electrode in the tube, the electrode being constructed to emit charged particles when heated,
means for heating the electrode to obtain the emission of charged particles by the electrode,
a first gas in the tube, the first gas being responsive to the emission of the charged particles by the electrode to become ionized and to provide a luminescence of the tube, and
an infinitesimal amount of a second gas in the tube, the second gas being responsive to charged particles in the tube to become ionized and, when ionized, to excite the phosphor, for enhancing the luminescence of the tube, the second gas being ammonia.

5. A gaseous tube, including
an envelope defined by envelope walls,
a phosphor coating on the envelope walls to provide a luminescence of the tube when excited,
an electrode in the tube, the electrode being constructed to emit charged particles when heated,
means for heating the electrode to obtain the emission of charged particles by the electrode,
a first gas in the tube, the first gas being responsive to the emission of the charged particles by the electrode to become ionized and to provide a luminescence of the tube, and
an infinitesimal amount of a second gas in the tube, the second gas being responsive to charged particles in the tube to become ionized and, when ionized, to excite the phosphor, for enhancing the luminescence of the tube, the second gas being iodine.

6. A gaseous tube, including
an envelope defined by envelope walls,
a phosphor coating on the envelope walls to provide a luminescence when excited,
an electrode in the tube, the electrode being constructed to pass electrical current and to become heated by the electrical current and to emit charged particles when heated,
the electrode further including a coating on the electrode, the coating having properties of emitting infinitesimal amounts of a first gas having properties of exciting the phosphor coating on the envelope walls to enhance any luminescence in the tube,
means for passing an electrical current through the electrode, and
a second gas in the tube in considerably greater percentage than the first gas, the second gas having properties of becoming ionized by the charged particles emitted by the electrode to produce a luminescence of the tube and of ionizing the first gas, the first gas being ammonia and the coating on the electrode including a chemical component selected from the group consisting of barium, calcium and strontium and having properties of accelerating the charged particles emitted by the electrode.

7. An electrode for use in a gaseous tube having a phosphor coating on the walls of the tube, including
a base material, and
a coating on the base material in the form of a thin layer, the coating having properties of emitting infinitesimal amounts of a gas having properties, when ionized, of exciting the phosphor coating, the gas emitted by the coating being ammonia.

8. An electrode for use in a gaseous tube having a phosphor coating on the walls of the tube, including
a metallic base material having properties of passing an electrical current and of becoming heated upon the passage of the electrical current, and
a coating on the base material in the form of a thin layer, the coating having properties of emitting infinitesimal amounts of a gas having properties, when ionized, of exciting the phosphor coating on the walls of the tube, the gas emitted by the coating being ammonia.

9. In combination in a luminescent gas tube:
a glass envelope,
a phosphor coated on the inner wall of the glass envelope, said phosphor being composed of a crystal lattice including activator portions having the property of absorbing incoming photons of certain wavelengths and using the energy of said incoming photons so absorbed to emit photons of visible light,
luminescent gas molecules sealed in the tube,
means for applying input electrical excitation signals to the tube in such manner as to excite the luminescent gas molecules to emit photons of electromagnetic radiation, and
a converter substance in the tube having the property of absorbing the photons of electromagnetic radiation from the luminescent gas molecules and using the energy from the electromagnetic radiation so absorbed to emit substantially only photons of those certain wavelengths that will be absorbed and changed to visible light by the activator portions of the phosphor, the addition that the converter substance being ammonia.

10. In combination in a luminescent gas tube:
a glass envelope,
a phosphor coated on the inner wall of the glass envelope, said phosphor being composed of a crystal lattice including activator portions having the property of absorbing incoming photons of certain wavelengths and using the energy of said incoming photons so absorbed to emit photons of visible light,
luminescent gas molecules sealed in the tube,
means for applying input electrical excitation signals to the tube in such manner as to excite the luminescent gas molecules to emit photons of electromagnetic radiation, and
a converter substance in the tube having the property of absorbing the photons of electromagnetic radiation from the luminescent gas molecules and using the energy from the electromagnetic radiation so absorbed to emit substantially only photons of those certain wavelengths that will be absorbed and changed to visible light by the activator portions of the phosphor, the addition that the converter substance being iodine.

11. A gaseous tube, including
an envelope defined by envelope walls,
a phosphor coating on the envelope walls to provide a luminescence of the tube when excited,
an electrode in the tube, the electrode being constructed to emit charged particles when heated,
means for heating the electrode to obtain the emission of charged particles by the eelctrode,
first gases in the tube with properties of becoming ionized by the charged particles emitted by the electrode,
a second gas in the tube, the second gas being responsive to the ionization of the first gas to become ionized and, when ionized, to excite the phosphor coating substantially only in the range of frequencies for producing luminescence of the tube, and
an infinitesimal amount of a third gas in the tube, the third gas being responsive to charged particles in the tube to become ionized and, when ionized to excite the phosphor for enhancing the luminescence of the tube, the first gases including neon and the second gas being ammonia.

12. The gaseous tube set forth in claim 11 wherein the third gas is iodine.

13. A gaseous tube, including
an envelope defined by envelope walls,
a phosphor coating on the envelope walls to provide a luminescence of the tube when excited, an electrode in the tube, the electrode being constructed to emit charged particles when heated, means for heating the electrode to obtain the emission of charged particles by the electrode, first gases in the tube with properties of becoming ionized by the charged particles emitted by the electrode, a second gas in the tube, the second gas being responsive to the ionization of the first gas to become ionized and, when ionized, to excite the phosphor coating substantially only in the range of frequencies for producing luminescence of the tube, and an infinitesimal amount of a third gas in the tube, the third gas being responsive to charged particles in the tube to become ionized and, when ionized, to excite the phosphor for enhancing the luminescence of the tube, the first gases including neon and further including an additional gas selected from a group consisting or argon, krypton, xenon and nitrogen and the second gas being ammonia.

14. The gaseous tube set forth in claim 13 wherein the third gas is iodine.

15. A luminescent tube having
a hermetically sealed envelope having first and second ends,
a phosphor coating on the inside of the envelope,
an electrical lead passing through the first end of the hermetically sealed envelope,
an electrode electrically connected to the electrical lead, said electrode being constructed of a first substance having a high rate of electron emission under the influence of electrical excitation,
a luminescent gas mixture inside the hermetically sealed envelope, and
a second substance associated with the first substance and operative to influence the electron emission of the first substance in such manner that the luminescent gas mixture is caused by the electron emission to emit photons of light substantially only within a band of wavelengths for the production of visible light by the phosphor coating, the second substance including ammonia gas.

16. The combination set forth in claim 15 wherein the second substance also includes iodine.

References Cited

UNITED STATES PATENTS

| | | | |
|---|---|---|---|
| 2,622,221 | 12/1952 | Beese | 313—109 |
| 2,714,681 | 8/1955 | Keiffer et al. | 313—109 |
| 2,840,751 | 6/1958 | Meister et al. | 313—346 X |
| 2,847,605 | 8/1958 | Byer | 313—346 |
| 2,916,652 | 12/1959 | Cardell et al. | 313—346 |
| 1,935,699 | 11/1933 | De Boer | 313—225 X |
| 2,020,723 | 11/1935 | Foulke | 313—108 |
| 3,219,867 | 11/1965 | White | 313—178 |

JAMES W. LAWRENCE, *Primary Examiner.*

PALMER C. DEMEO, *Assistant Examiner.*

U.S. Cl. X.R.

313—223, 226, 346, 355